(12) United States Patent
Kaul

(10) Patent No.: US 11,664,690 B2
(45) Date of Patent: May 30, 2023

(54) COMBINED PROPELLANT-LESS PROPULSION AND REACTION WHEEL DEVICE

(71) Applicant: Pathfinder Propulsion, LLC, Denver, CA (US)

(72) Inventor: Anoup Kaul, Edmonton (CA)

(73) Assignee: Pathfinder Propulsion, LLC, Denver, CA (US)

( * ) Notice: Subject to any disclaimer, the term of this patent is extended or adjusted under 35 U.S.C. 154(b) by 0 days.

(21) Appl. No.: 17/657,919

(22) Filed: Apr. 4, 2022

(65) Prior Publication Data

US 2022/0302776 A1    Sep. 22, 2022

Related U.S. Application Data

(63) Continuation of application No. 16/852,919, filed on Apr. 20, 2020, now Pat. No. 11,309,753, which is a continuation-in-part of application No. 15/765,673, filed as application No. PCT/US2016/056146 on Oct. 7, 2016, now Pat. No. 11,088,608.

(Continued)

(51) Int. Cl.
| | |
|---|---|
| *H02K 1/26* | (2006.01) |
| *H02K 1/27* | (2022.01) |
| *H02K 11/33* | (2016.01) |
| *H02K 3/48* | (2006.01) |

(Continued)

(52) U.S. Cl.
CPC ............. *H02K 1/26* (2013.01); *H02K 1/27* (2013.01); *H02K 3/48* (2013.01); *H02K 11/33* (2016.01); *B63H 21/17* (2013.01); *B64G 1/244* (2019.05)

(58) Field of Classification Search
CPC .......... G02B 7/00; G02B 7/005; G02B 7/006; G02B 26/00; G02B 26/008; H02K 21/00; H02K 49/10; H02K 51/00; H02K 1/278; H02K 7/106; H02K 21/029; H02K 21/14; H02K 49/106; H02K 49/108; H02K 53/00; H02K 7/11; H02K 49/102; H02K 16/00; F16C 39/063; H02N 11/008
See application file for complete search history.

(56) References Cited

U.S. PATENT DOCUMENTS 3,895,245 A * 7/1975 Bode ................... H02K 25/00
                                                  310/46
5,172,784 A   12/1992 Varela, Jr.
(Continued)

FOREIGN PATENT DOCUMENTS

WO    WO2019145942    8/2019

*Primary Examiner* — Leda T Pham
(74) *Attorney, Agent, or Firm* — Robinson IP Law, PLLC

(57) ABSTRACT

A method of de-spinning a rotor of a propulsion system includes providing one or more spinning rotors rotatably mounted on a frame with a bearing having a bearing outer race, bearing balls, and bearing inner race; providing a force mechanism coupled with the one or more spinning rotors for applying a load to the one or more spinning rotors; and loading an outer portion of the outer bearing race, bearing ball, and inner bearing race of the bearing, a load on the outer portion of the bearing race, bearing ball, and inner bearing race of the bearing corresponding to a force applied to the one or more spinning rotors by the drive mechanism. The one or more spinning rotors de-spin at a rate corresponding to the load on the bearing balls.

6 Claims, 15 Drawing Sheets

Related U.S. Application Data

(60) Provisional application No. 62/835,997, filed on Apr. 18, 2019, provisional application No. 62/389,340, filed on Feb. 22, 2016, provisional application No. 62/284,762, filed on Oct. 8, 2015.

(51) Int. Cl.
  *B63H 21/17*  (2006.01)
  *B64G 1/24*  (2006.01)

(56) References Cited

U.S. PATENT DOCUMENTS

| | | |
|---|---|---|
| 7,791,441 B1 | 9/2010 | Jefferson |
| 9,413,214 B2 | 8/2016 | Giunmo |
| 2008/0024017 A1* | 1/2008 | Chen ................ H02K 53/00 310/36 |
| 2012/0120516 A1 | 5/2012 | Harrell et al. |
| 2013/0147298 A1 | 6/2013 | Giunmo |
| 2014/0203678 A1 | 7/2014 | Haggard |
| 2019/0089235 A1 | 3/2019 | Kaul |
| 2020/0089235 A1 | 8/2020 | Kaul |

* cited by examiner

COMBINED PROPELLANT-LESS PROPULSION AND REACTION WHEEL DEVICE

CROSS-REFERENCE TO RELATED APPLICATIONS

This application is a continuation of U.S. patent application Ser. No. 16/852,919 for a "Combined Propellant-Less Propulsion and Reaction Wheel Device" filed on Apr. 20, 2020, which claims priority to U.S. Provisional Patent Application No. 62/835,997 for a "Combined Propellant-less Propulsion and Reaction Wheel Device" filed on Apr. 18, 2019, and U.S. patent application Ser. No. 15/765,673 for a "Self-propelling System" filed on Apr. 3, 2018, which claims priority to and is a national phase application of PCT Patent Application No. PCT/US2016/056146 for a "Self-propelling System" filed on Oct. 7, 2016, which claims priority to U.S. Provisional Patent Application No. 62/284,762 filed on Oct. 8, 2015 and claims priority to U.S. Provisional Patent Application No. 62/389,340 filed on Feb. 22, 2016, the contents of which are incorporated herein by reference in their entireties.

FIELD

This disclosure relates generally to vehicle attitude control and propulsion and relates specifically to vehicles traveling in the vacuum of space or on bodies of water. Additionally, the disclosure describes and enables multiple improvements over current spacecraft attitude control and propulsion technology such as: launch mass, scalability, reaction wheel de-spinning and overall system design simplification.

BACKGROUND

Spacecraft have been used to conduct research on the earth and other celestial bodies, provide communication services that cover the globe and even carry man to the moon. In addition, efforts have begun that seek to mine asteroids for precious metals and resources. While there have been many advances in all of the critical systems required to accomplish a given space mission, the in-space propulsion system has remained largely unchanged since our first launches.

A critical short coming of the current propulsion technology is the need to use a chemical propellant to generate thrust. This reliance on propellant has led to added complexity and cost to spacecraft design specifically the need to include fuel tanks and fuel line routing, filtering, valves and flow gauges. These system elements add substantially to the spacecraft mass and because spacecraft launch mass is a critical component in determining launch costs, the current state of propulsion technology is economically inefficient. In addition, the operational life of most spacecraft is dictated primarily by fuel consumption because once the fuel tank is empty there is no way to refill it once in orbit.

Recently, satellite bus structures have decreased in size and operators have leveraged the maturation of reliable, mass produced electronics, sensors and radio components used in smart phone technology. Unfortunately, while small in size these vehicles can still provide a powerful platform for communications, earth observation and interplanetary missions. Traditional fuel-based propulsion systems do not scale down in size well which has left small/micro/nano spacecraft without thruster capabilities. Without propulsion smaller buses operating lifetimes are limited. When they are in low earth orbit, they experience drag due to the earth's upper atmosphere. This drag continually slows the vehicles down reducing its speed and orbital altitude until they become inoperable and burn up in the atmosphere. The current device aims to address both the excessive launch mass and scalability problems associated with current propellant based propulsion systems by providing thrust without propellant that is capable of providing drag makeup thrust and maintain the spacecraft's desired orbital altitude while also being scalable in design to work with satellites of all sizes.

In addition, individual propellant-based thruster units are limited to generating thrust in only one direction. Accordingly, there exists a need for a spacecraft thruster that can address bi-directionality as well. An optimum solution would allow straightforward mechanical and electrical integration into the current satellite designs.

In some spacecraft attitude control is achieved through the use of reaction wheels. Typically, a reaction wheel is comprised of an electric motor attached to a flywheel. The reaction forces created while spinning up the flywheel are utilized to achieve changes in angular orientation of the vehicle and controlled to reach a desired pointing direction. Once the flywheel is spun up there is no straightforward way to stop the fly wheel from spinning or to de-spin the fly wheel. Some spacecraft may utilize their propulsion system to provide counter torques in conjunction with motor commands. Embodiments herein may not only provide attitude control through reaction wheel mechanisms (reactions or actions on its electro-magnetic coils) but may also de-energize and de-spin its own flywheel(s) internally through elastic strain losses in its bearings. An additional issue with current reaction wheel configurations is a limitation on the torque that may be produced. Once a reaction wheel motor has reached a maximum speed it will not be able to produce a counter torque and it has become saturated. This is because the back emf produced by the spinning rotor is effectively equal to the applied voltage on the coils. Embodiments herein addresses this saturation issue by shorting the electro-magnetic coils of one of the paired rotors which will provide not only a load to prevent saturation of the active rotor, but also a complimentary torque on the shorted coils. The combination of all these features will provide both propulsion and attitude control in a single unit thereby significantly simplifying spacecraft system architecture.

SUMMARY

The above and other needs are met by a method and apparatus for providing propulsion and attitude control. Embodiments of the present disclosure are directed towards spacecraft by providing a novel form of propellant-less propulsion. A general description of this disclosure involves in one aspect the arrangement of a multiplicity of permanent magnets mounted on at least one pair of synchronized coplanar counter rotating structures/rotors. In one aspect one rotates clockwise CW while the other rotates counterclockwise CCW such that net positive linear momentum is generated through ball bearing traction. This traction is transferred through rigid body attachment of the inner race of the ball bearings to the shafts and then onto a support platform and platform attachment points to the vehicle at large creating a translational force on the system. Therein, thrust or linear momentum is achieved by the vehicle. Rotation may be created and maintained by an electric powered motor. This motor may be integral to the rotating structures or separately associated therewith. Embodiments may include a plurality of synchronized rotor pairs sharing the same shaft pairs.

System torques may be created through interaction between the electro-magnetic coils and magnets mounted on one or the other rotor. A variety of control architectures may be implemented to achieve rotation of a desired angle or angular rate. A basic control loop may entail operating a single electro-magnetic coil on a single rotor for a small duration of time. Reactionary forces create a torque on the coil and the body it is attached to. A second electro-magnetic coil on the neighboring rotor may be operated for an equivalent duration such that an equivalent reactionary torque is created in the opposite direction thereby arresting the system rotational motion. A relationship between the spacecraft mass and distance from the center of mass of the individual coils must be accounted for to achieve desired angular displacement.

In a first aspect, a propulsion method includes: providing a pair of synchronized rotors, each of the synchronized rotors rotatably mounted on a frame with a bearing having a bearing outer race, bearing balls, and bearing inner race; providing a plurality of permanent magnets mounted on the pair of synchronized rotors and arranged such that at least one permanent magnet of a first of the pair of synchronized rotors is attracted to at least one permanent magnet of a second of the pair of synchronized rotors when the permanent magnets are proximate one another at an inboard orientation; rotating the pair of synchronized rotors such that one of the pair of synchronized rotors rotates in a clockwise direction and the other of the pair of synchronized rotors rotates in a counterclockwise direction; loading an outer portion of the outer bearing race, bearing ball, and inner bearing race of each of the bearings relative to a point at which the at least one permanent magnet of the first of the pair of synchronized rotors is closest to at least one permanent magnet of the second of the pair of synchronized rotors, a load on the outer portion of the bearings corresponding to an attractive force between the permanent magnets of the pair of synchronized rotors. A thrust is imparted on the frame in a direction corresponding to a direction of loading of the inner bearing race.

In one embodiment, the propulsion method further includes providing one or more electromagnets located proximate to the pair of synchronized rotors, wherein the one or more electromagnets are aligned with the plurality of permanent magnets such that a rotational force is imparted on the pair of synchronized rotors when the one or more electromagnets are activated.

In another embodiment, the propulsion method further includes a unit-polar control circuit for controlling the one or more electromagnets. In yet another embodiment, the propulsion method further includes providing one or more optical sensors and adjusting a current applied to the one or more electromagnets based on an output of the one or more optical sensors.

In one embodiment, the propulsion method further includes providing a vehicle on which the frame is mounted, wherein the thrust imparted on the frame is imparted on the vehicle. In another embodiment, the propulsion method further includes: providing a controller for controlling rotation of the pair of synchronized rotors; receiving data on the controller from at least one of a gyroscope and accelerometer; controlling rotation of the pair of synchronized rotors to generate a desired propulsion effect on the vehicle.

In yet another embodiment, the pair of synchronized rotors are intermeshed with a spur gear profile. In one embodiment, the propulsion method further includes determining a time required for the pair of synchronized rotors to stop rotating based on a load placed on the bearing balls at the outer portion of the outer bearing race and the inner bearing race.

In a second aspect, a reaction wheel thrust mechanism includes: a first rotor rotatably coupled on a frame at a first bearing, the first bearing having a first outer bearing race, a plurality of first bearing balls, and a first inner bearing race; a second rotor rotatably coupled on the frame at a second bearing, the second bearing having a second outer bearing race, a plurality of second bearing balls, and a second inner bearing race; a plurality of permanent magnets located on the first rotor and the second rotor, the plurality of permanent magnets oriented such that a first permanent magnet on the first rotor is attracted towards a second permanent magnet on the second rotor when the first permanent magnet is at its most proximate location relative to the second permanent magnet; a controller for controlling rotation speeds of the first rotor and the second rotor. When electro-magnetic coils of the first rotor are activated by the controller, the electro-magnetic coils impart a torque onto the first rotor and the first rotor will impart reactionary torque onto the electro-magnetic coils and the frame and a vehicle attached thereto.

In one embodiment, the first rotor and the second rotor are synchronized with a spur gear profile formed around the first rotor and the second rotor. In another embodiment, the controller adjusts speeds of rotation of the first rotor and the second rotor based on a desired thrust to be imparted on the vehicle. In yet another embodiment, the controller adjusts speeds of rotation of the first rotor and shorts the electro-magnetic coils of the second rotor to achieve a desired rate of angular change.

In a third aspect, a reaction wheel thrust mechanism includes: a first rotor rotatably coupled on a frame at a first bearing, the first bearing having a first outer bearing race, a plurality of first bearing balls, and a first inner bearing race; a second rotor rotatably coupled on the frame at a second bearing, the second bearing having a second outer bearing race, a plurality of second bearing balls, and a second inner bearing race; a plurality of permanent magnets located on the first rotor and the second rotor, the plurality of permanent magnets oriented such that a first permanent magnet on the first rotor is attracted towards a second permanent magnet on the second rotor when the first permanent magnet is at its most proximate location relative to the second permanent magnet; a controller for controlling rotation speeds of the first rotor and the second rotor. When electro-magnetic coils of the first rotor are activated by the controller, the electro-magnetic coils impart a torque onto the first rotor and the first rotor will impart reactionary torque onto the electro-magnetic coils and the frame and a vehicle attached thereto. The controller adjusts speeds of rotation of the first rotor and the second rotor based on a desired thrust to be imparted on the vehicle.

In one aspect, a method of de-spinning a rotor of a propulsion system includes: providing one or more spinning rotors rotatably mounted on a frame with a bearing having a bearing outer race, bearing balls, and bearing inner race; providing a force mechanism coupled with the one or more spinning rotors for applying a load to the one or more spinning rotors; loading an outer portion of the outer bearing race, bearing ball, and inner bearing race of the bearing, a load on the outer portion of the bearing race, bearing ball, and inner bearing race of the bearing corresponding to a force applied to the one or more spinning rotors by the drive mechanism. The one or more spinning rotors de-spin at a rate corresponding to the load on the bearing balls.

The one or more spinning rotors may comprise a pair of synchronized rotors. The method may further include a plurality of permanent magnets and be arranged such that at least one permanent magnet of a first of the pair of synchronized rotors is attracted to at least one permanent magnet of a second of the pair of synchronized rotors when the permanent magnets are proximate one another at an inboard orientation. Further, one or more electromagnets may be provided that are located proximate to the pair of synchronized rotors, wherein the one or more electromagnets are aligned with the plurality of permanent magnets such that a rotational force is imparted on the pair of synchronized rotors when the one or more electromagnets are activated. Methods herein may further include providing a vehicle on which the frame is mounted.

In another aspect, a reaction wheel thrust mechanism includes: a first rotor rotatably coupled on a frame at a first bearing, the first bearing having a first outer bearing race, a plurality of first bearing balls, and a first inner bearing race; a second rotor rotatably coupled on the frame at a second bearing, the second bearing having a second outer bearing race, a plurality of second bearing balls, and a second inner bearing race; a plurality of permanent magnets located on the first rotor and the second rotor, the plurality of permanent magnets oriented such that a first permanent magnet on the first rotor is attracted towards a second permanent magnet on the second rotor when the first permanent magnet is at its most proximate location relative to the second permanent magnet to impart a force on the first bearing balls of the first rotor and the second bearing balls of the second rotor; and a controller for controlling rotation speeds of the first rotor and the second rotor. When electro-magnetic coils of the first rotor are activated by the controller, the electro-magnetic coils impart a torque onto the first rotor and the first rotor will impart reactionary torque onto the electro-magnetic coils and the frame and a vehicle attached thereto. When electro-magnetic coils of the first rotor are de-activated by the controller, the force imparted on the first bearing balls of the first rotor and the second bearing balls of the second rotor de-spin the first rotor and the second rotor.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

The terms, "for example," "e.g.," "in one/another aspect," "in one/another scenario," "in one/another version," "in some configurations," "in some implementations," "preferably," "usually," "typically," "may," and "optionally," as used herein, are intended to be used to introduce non-limiting embodiments. Unless expressly stated otherwise, while certain references are made to certain example system components or services, other components and services may be used as well and/or the example components may be combined into fewer components and/or divided into further components.

Embodiments herein provide a self-propelling propulsion system powered with electricity and utilizing at least two synchronized rotors each with a multiplicity of electromagnets or permanent magnets mounted along each rotor's perimeter which interact with the other rotor's magnetics through attracting or repelling forces. In some embodiments the rotors may be spun through use of an integral set of integral electromagnetic coils or through separate electric motors connected with a gear box. With either embodiment the device may be used to changed vehicle orientation through reactionary torques produced on the integral coil or separate electric motor stator elements. In the following description, numerous specific details are set forth. However, it is understood that embodiments may be practiced without these specific details. In other instances, well-known materials, structures, and techniques have not been shown in detail in order not to obscure the understanding of this description.

Turning now to the drawings, which are included by way of example and not limitation, embodiments of the present disclosure are directed towards a single pair of interacting synchronized rotors having an equivalent number of permanent magnets mounted on each respectively.

Furthermore, in some embodiments of the self-propelling apparatus the magnets mounted on the rotor will utilize different magnetic orientation, size, shape and number. Other embodiments may make use of magnetic sensors instead of optical sensors for tracking rotor position.

Figure 1A:
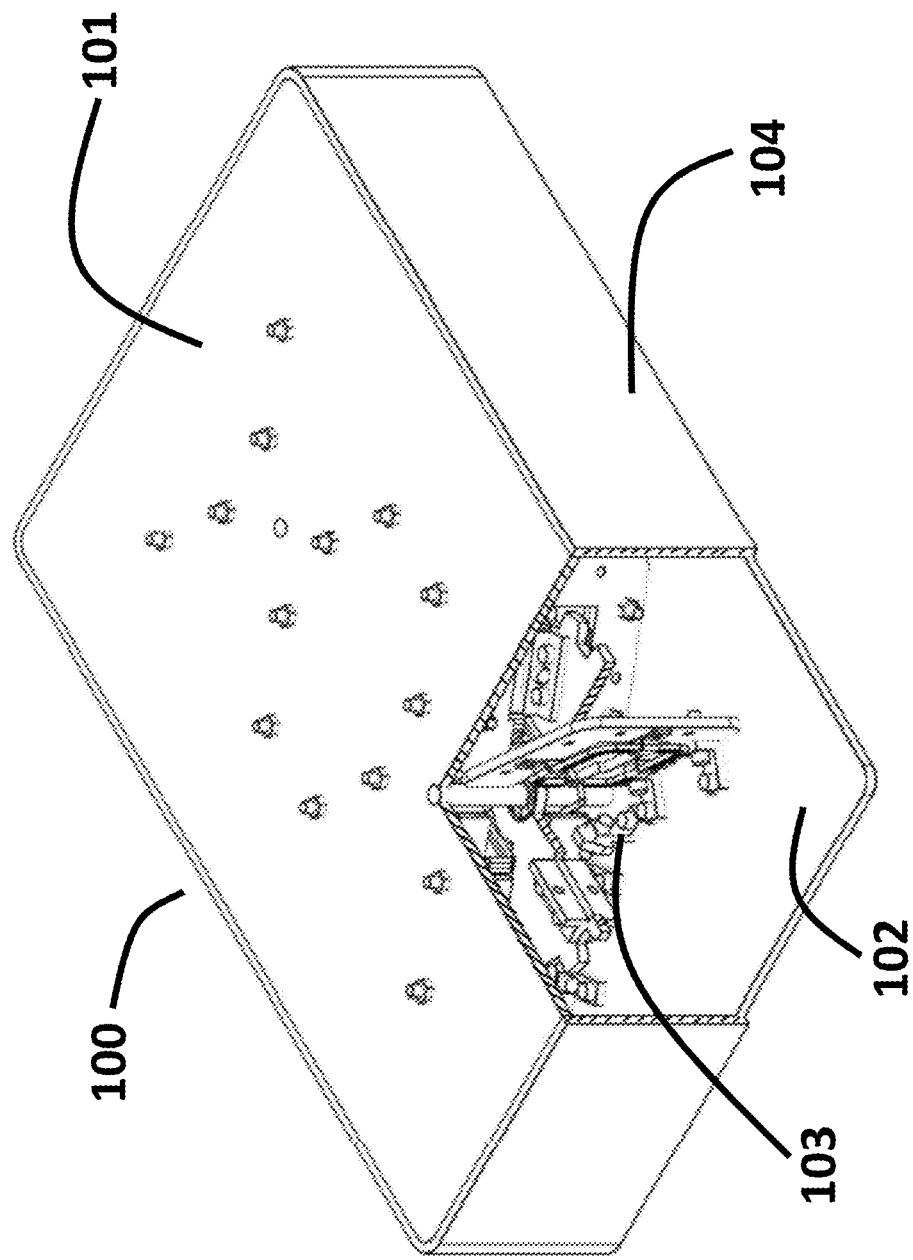
FIG. 1A shows an isometric view of one embodiment of a known self-propelling apparatus with integral electro-magnetic coils and permanent magnets mounted at the mid-plane of rotors with integrated spur gear profile for synchronization shown with a cut away in its enclosing shell and top plate for clarity.
Figure 1B:
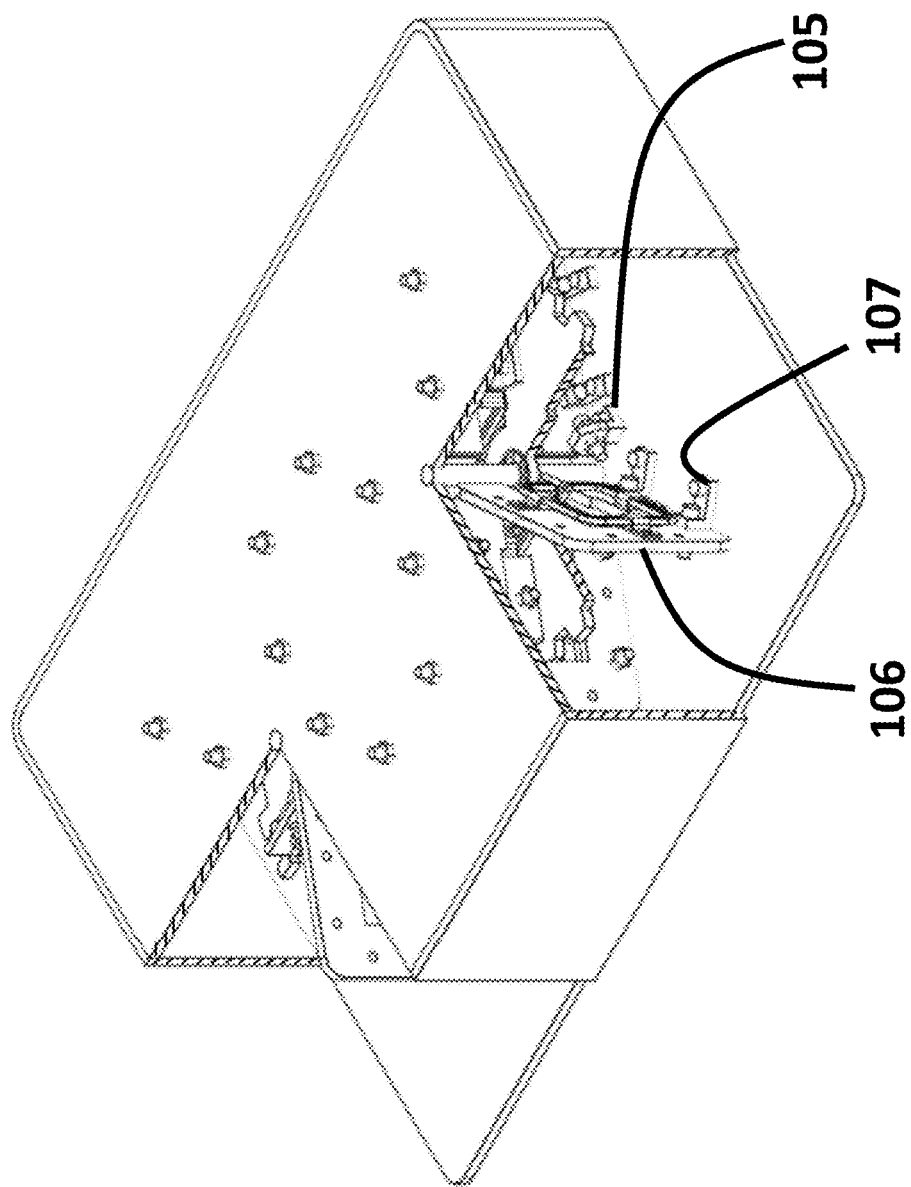
FIG. 1B shows an isometric view of one embodiment of a known self-propelling apparatus with integral electro-magnetic coils and permanent magnets mounted at the mid-plane of rotors with integrated spur gear profile for synchronization shown with a cut away in its enclosing shell and top plate for clarity.

One possible configuration of a self-propelling apparatus with integral electro-magnetic coils 100 is shown in FIG. 1A. Top 101 and bottom 102 plates of the apparatus are shown in FIG. 1A along with optical source and sensor 103 and enclosure panel 104. FIG. 1B shows a second optical source and sensor 105 along with coil support plates 106 and mounting L-brackets 107. In some embodiments the plates can be made from sheet metal or carbon fiber honeycomb panels.

Figure 2:
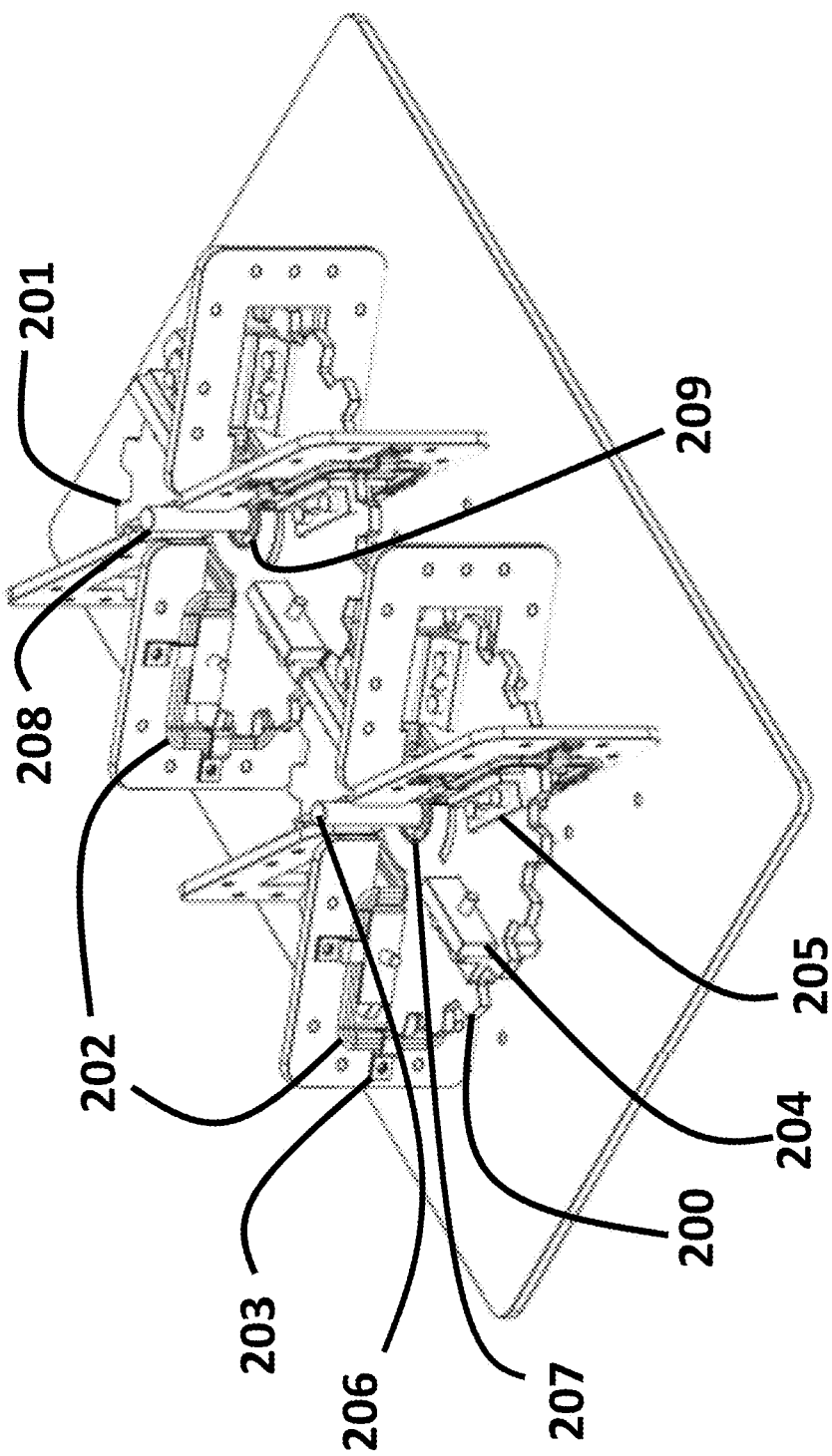
FIG. 2 shows an isometric view of one embodiment of a self-propelling apparatus with integral electro-magnetic coils and permanent magnets mounted at the mid-plane of rotors with integrated spur gear profile for synchronization shown without a top or enclosing element.

FIG. 2 shows a pair of rotors with integrated spur gear profile for synchronization 200 and 201. For clarity, the rotor on the left 200 of FIG. 2 is referred to as rotor 1 (or first rotor) and the rotor on the right 201 is referred to as rotor 2 (or second rotor). FIG. 2 also shows integral electro-magnetic C-coils 202 and coil clips 203. Also seen in FIG. 2 are transversely mounted permanent magnets 204 and magnet mounting L-brackets 205. Each rotor is shown mounted to independent shafts 206, 208 with bearings 207, 209.

Figure 3A:
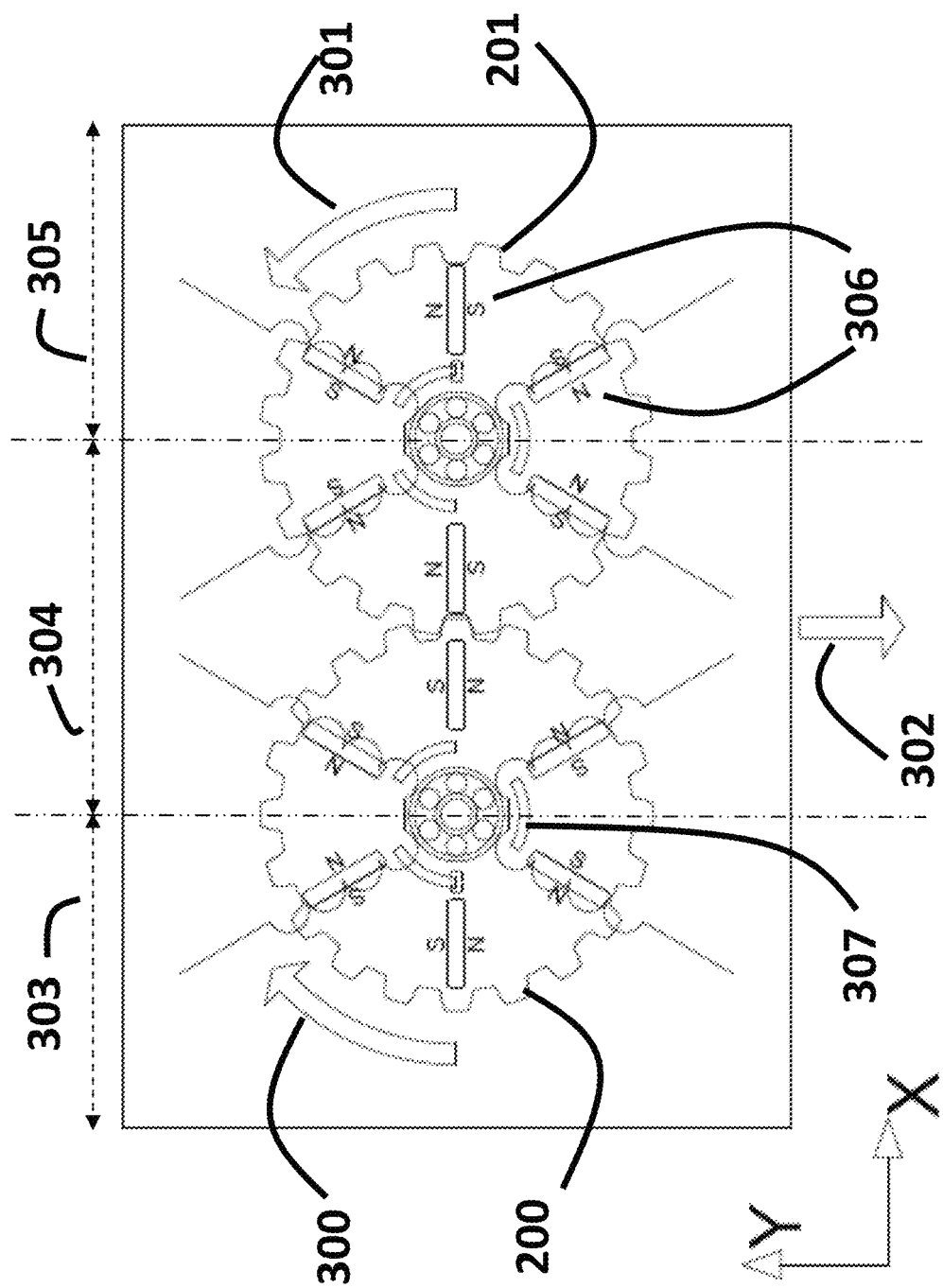
FIG. 3A shows a top schematic view showing magnet pole orientation along with a first operating mode rotation direction and thrust direction relationship according to one embodiment of the present disclosure.

Referring to FIG. 3A a matched pair of integrated rotors with spur gear profile are shown 200 and 201. Orientations of permanent magnets are denoted by North N and South S labels 306. Also seen in FIG. 3A are arc shaped optical slots 307 which are aligned with an optical source and sensors. A relationship between rotor rotation direction and thrust direction is denoted by clockwise arrow 300 for rotor 1 200, counterclockwise arrow 301 for rotor 2 201 and thrust arrow in −Y direction 302. To help understand the loads acting on the rotor's zones 303, 304 and 305 are shown in FIG. 3A. The zones are described as outboard zone 303 of rotor 200, inboard zone 304 of rotors 200 and 201 and outboard zone 305 of rotor 201.

Figure 3B:
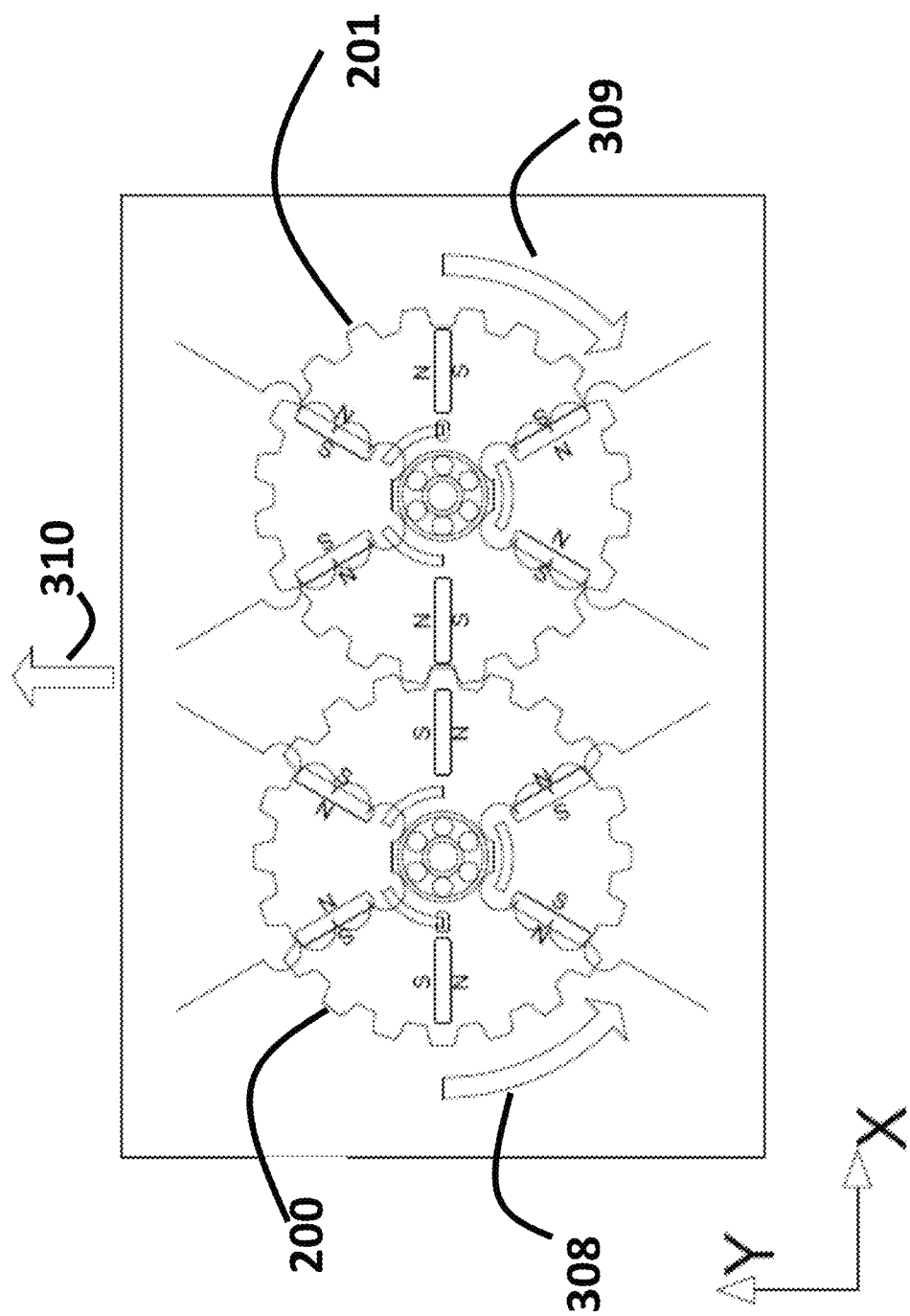
FIG. 3B is a top schematic view showing magnet pole orientation along with a second operating mode rotation direction and thrust direction relationship according to one embodiment of the present disclosure.

Referring to FIG. 3B, a relationship between a counterclockwise rotating 308 rotor 200 with a clockwise 309 rotating rotor 201 will generate a thrust in the +Y direction 310 is shown.

Figure 4:
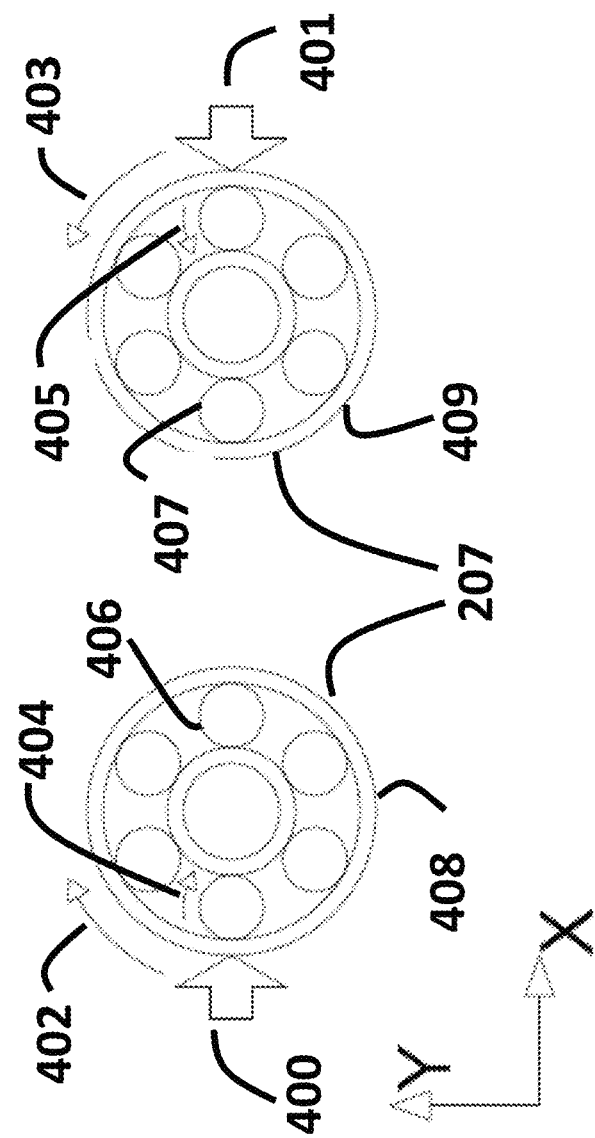
FIG. 4 is a close-up view of rotor bearings showing an outboard loading case along with outer-race and ball bearing rotation of both a first rotor and a second rotor according to one embodiment of the present disclosure.
Figure 5:
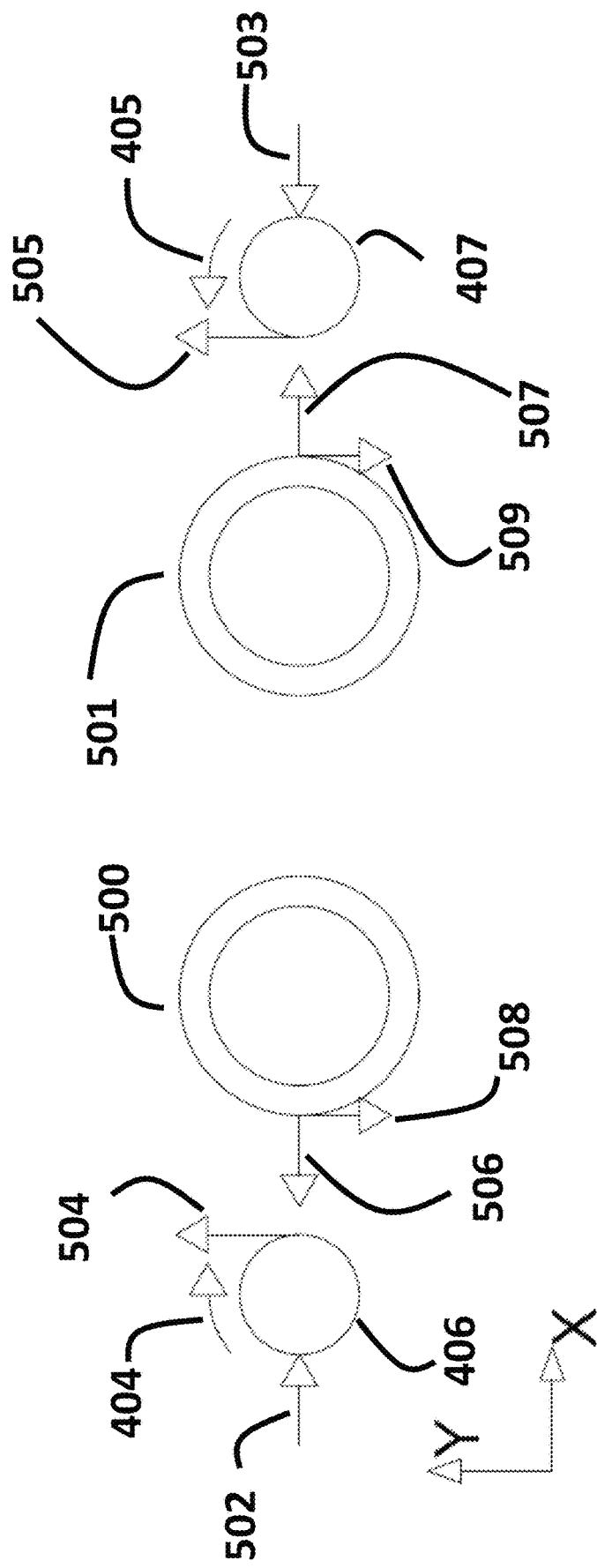
FIG. 5 is an exploded close-up view of a single bearing ball element and inner race element of both a first rotor and a second rotor illustrating the loading, normal and frictional forces according to one embodiment of the present disclosure.

For magnet orientations shown in FIG. 3, it is shown that there will be attraction between neighboring magnets on rotor 200 and 201 as neighboring magnets travel through inboard zone 304. FIGS. 4 and 5 show how forces are carried from the rotor to the bearing outer race, bearing balls and inner race. FIG. 4 shows a close up of rotor bearings 207 and 209 along with arrows denoting loading direction 400 and 401 experienced by outer races of each bearing assembly during loading. It is also shown in FIG. 4 that if rotor 200 is spinning in a clockwise direction, an outer race 408 and bearing balls 406 will also be spinning in clockwise direction denoted by arrows 402 and 404. It is also shown that the neighboring rotor 201 will be spinning in the counterclockwise direction 403 along with its outer race 409 and its bearing balls 407.

Thrust Generation—Traction Mechanism

Figure 6:
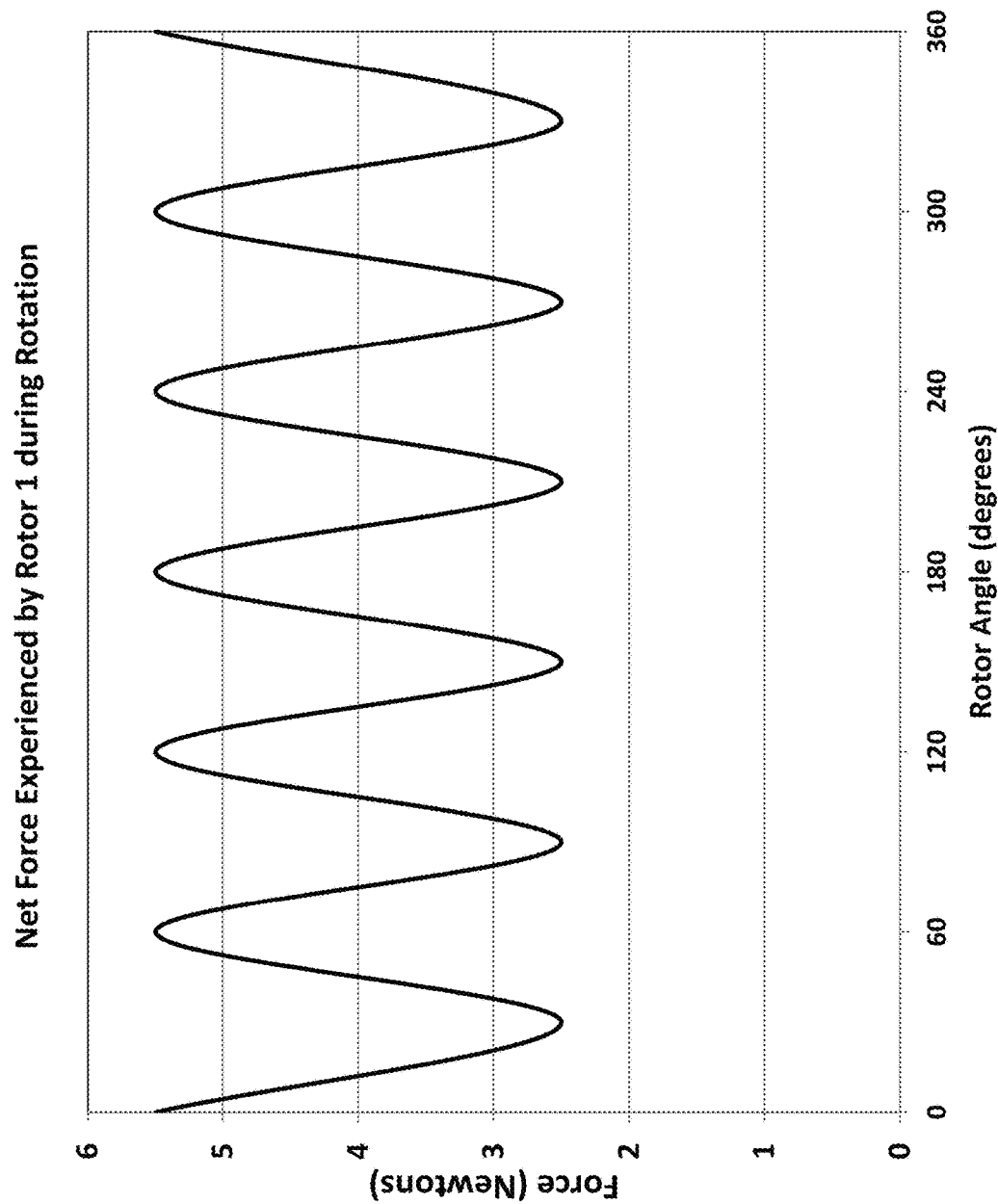
FIG. 6 is a graph showing the variation of loading in the +X direction on a first rotor due to the net magnetic attraction forces between its magnets and the magnets on a second rotor according to one embodiment of the present disclosure.

As an example to illustrate how attracting forces as shown in the figures will generate thrust, twelve Neodymium Boron magnets grade N42 strength are provided with dimension one inch tall by one inch wide by 3/16 inches thick each mounted with orientations shown in FIG. 3A. FIG. 6 shows a plot of a net force in the +X direction experienced by rotor 200 due to rotor 201 during one rotation. As stated above, because of magnet orientation, a net force between the rotors is known and will always be attractive, and will be carried by the ball bearings traveling on outboard side of the bearing i.e. zones 303 and 305 of FIG. 3A. Letting the instantaneous load on rotor 200 be L200(t) the following is defined:

$L200(t) = (G200(t)_1 + G200(t)_2 + \ldots + G200(t)_N)$; summation of all bearing ball loads where referring to FIG. 5, $G200(t)_i$, 502 is a load carried by an ith outboard ball bearing. As further shown in FIG. 5, a normal load 506 carried by inner race 500 due to the ith ball bearing and its instantaneous value is expressed as $N200(t)_i$. For non-slipping conditions, a frictional force 504 results and is experienced by the ith ball bearing due to the inner race along with 508 the frictional force experienced by the inner race due to the ith ball bearing rotation as shown in FIG. 5. Using the above expression for normal load, the instantaneous frictional force can be determined as $F_f 200(t)_i = mu_s * N200(t)_i$; where $mu_s$ is the static coefficient of friction For the case of rotor 200 and its associated ball bearings rotating in clockwise direction 406, FIG. 5 shows that a force experienced by its inner race 500 will be in the −Y direction 508. Further, FIG. 5 shows how forces acting in rotor 201 ball bearing will act during its associated counterclockwise rotation. A loading on rotor 201 due to the magnets on rotor 200 will be in the −X direction and vary in a similar fashion to FIG. 6 which is provided as follows:

$L201(t) = -L200(t)$; where $L201(t)$ is the net load carried by rotor 2 where $L201(t) = (G201(t)_1 + G201(t)_2 + \ldots + G201(t)_N)$; summation of all bearing ball loads Referring to FIG. 5, $G201(t)_i$ 503 is the load carried by the ith outboard ball bearing. $N201(t)_i$ 507 in FIG. 5 is a normal load carried by the inner race 501 due to rotor 201's ith ball bearing. For non-slipping conditions this results in a frictional force 505 experienced by the ith ball bearing due to the inner race along with 509 the frictional force experienced by the inner race due to the ith ball bearing rotation as shown in FIG. 5. This can be written as:

$F_f 201(t)_i = mu_s * N201(t)_i$; where $mu_s$ is the static coefficient of friction Frictional forces experienced by inner races 500 and 501 are both in the −Y direction and will therefore add constructively together. This constructive action will continue through their associated shafts resulting in a net translational force acting from the shafts onto the top and bottom plates of the device. This net translational force experienced by the device assembly will also be transferred onto any attached free-floating body i.e. propulsion will occur. It should be noted that there is an associated frictional force component in the +/−X direction as the ball bearings rotate. However, due to symmetry of the rotor motion and loading direction these X direction forces will cancel out.

Figure 7:
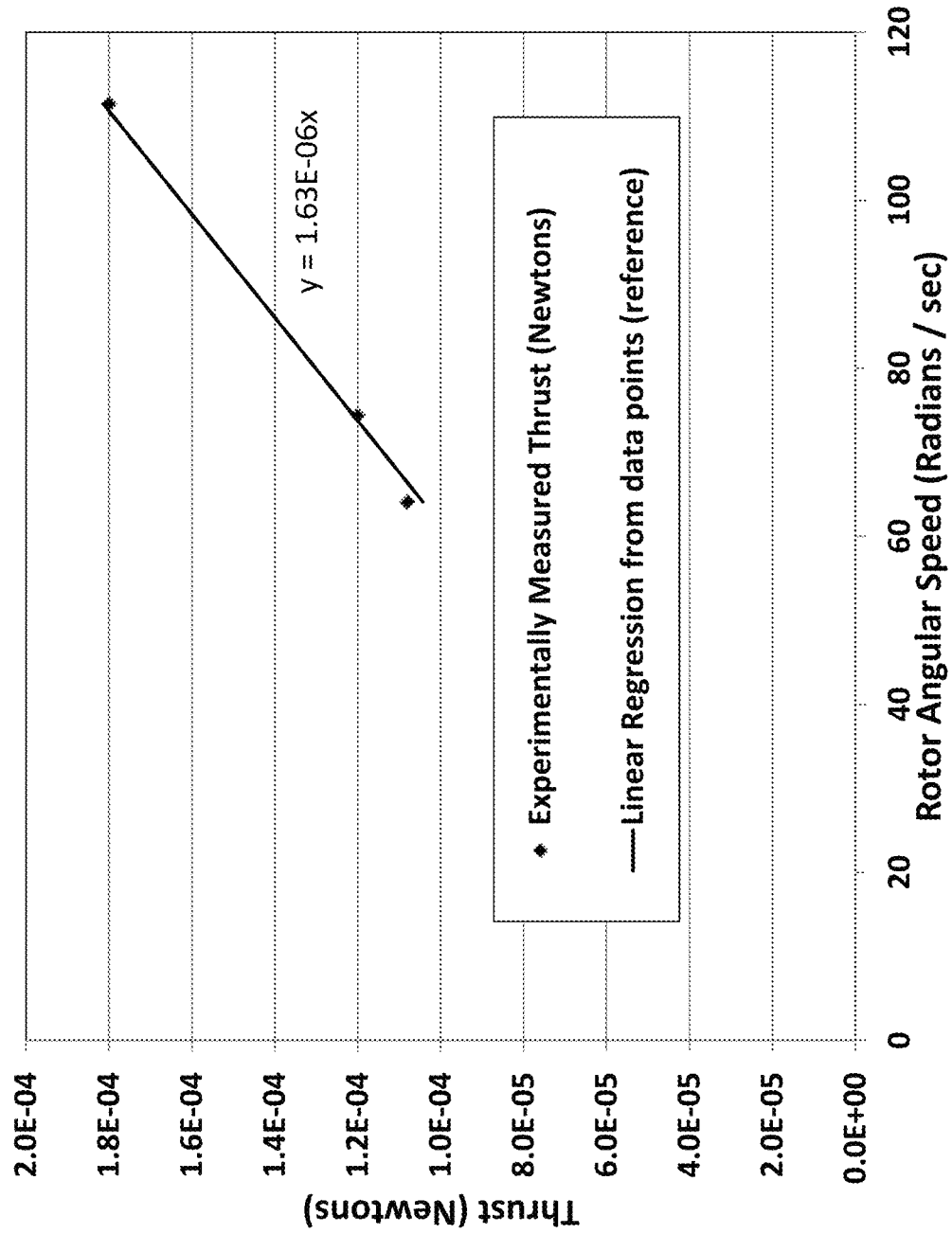
FIG. 7 is a graph showing the relationship of rotor speed to generated thrust for rotors subjected to loading shown in FIG. 6 according to one embodiment of the present disclosure.

FIG. 7 shows a graph relating the rotor angular speed in radians per second to the measured thrust in Newtons for a device with loading per FIG. 6. The relationship between thrust and angular speed is dependent on ball bearing and inner race material as this variable determines the static friction coefficient. The total number of ball bearings to also effects the thrust to angular speed relationship in other embodiments.

Table 1 below summarizes a relationship between the rotor loading, spin direction and the direction of the net thrust created.

TABLE 1

| Case | Rotor 1 Spin Direction | Rotor Radial Loading Direction | Traction between Rotor 1 ball bearing and fixed race/shaft | Rotor 2 Spin Direction | Rotor Radial Loading Direction | Traction between Rotor 2 ball bearing and fixed race/shaft | Direction of Thrust on Frame |
|---|---|---|---|---|---|---|---|
| 1 | CW | +x | −y | CCW | +x | −y | +y |
| 2 | CW | −x | +y | CCW | −x | +y | −y |
| 3 | CCW | +x | +y | CW | +x | +y | −y |
| 4 | CCW | −x | −y | CW | −x | −y | +y |

Uni-Polar Motor Circuit Configuration and Operation

Figure 8:
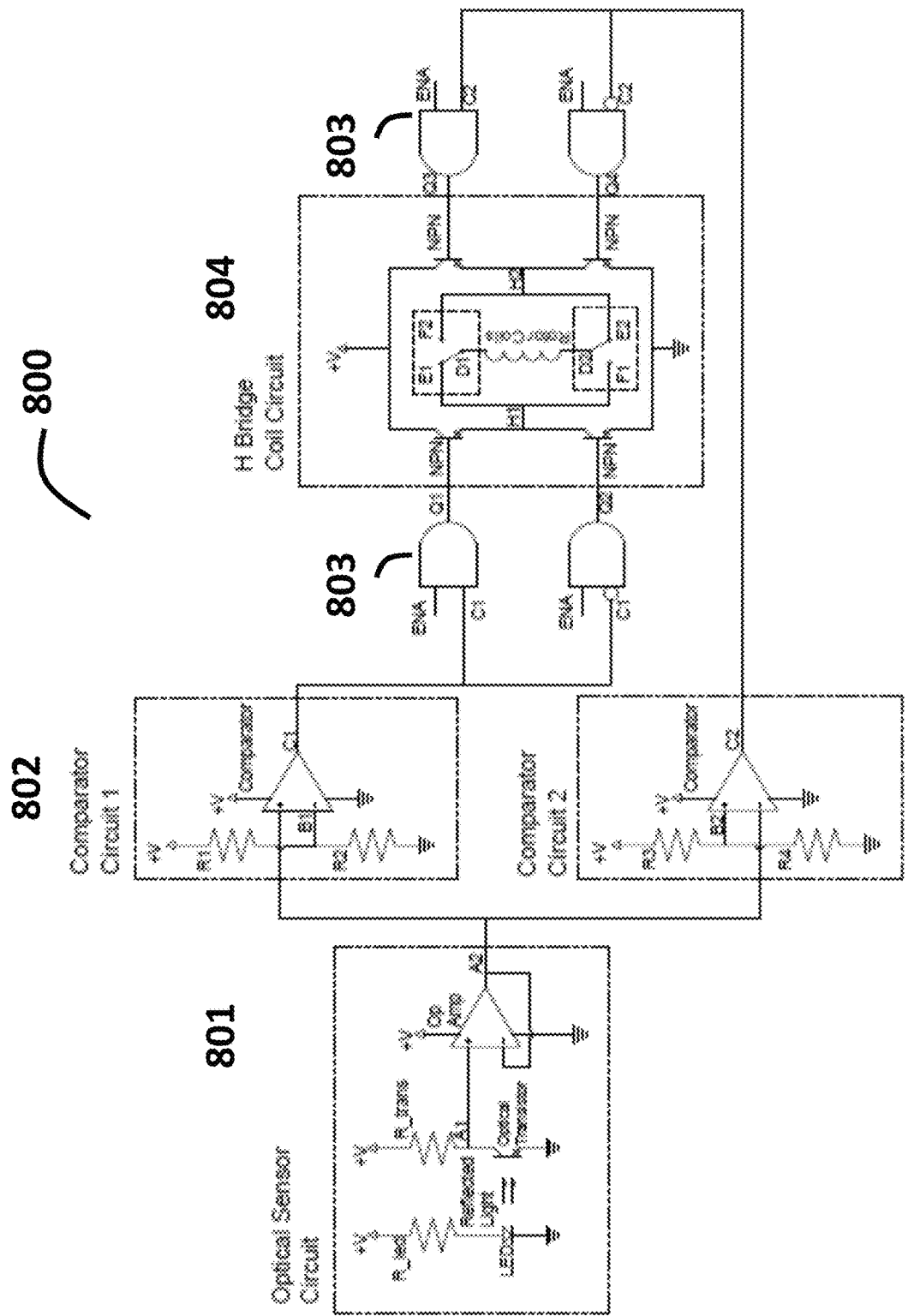
FIG. 8 is a circuit schematic view illustrating an H-bridge unipolar electronic speed controller for a single set of coils around a single rotor.

FIG. 8 shows a uni-polar control circuit configuration 800 for a single phase of coils mounted around the perimeter of a single rotor. This circuit embodiment has four sections: an optical sensor circuit 801, a pair of comparator circuits 802, a set of AND gates 803 and an H bridge transistor circuit 804. As shown in FIG. 8, an optical sensor circuit 801 includes a resistor (R_led) that adjusts the current delivered to the light source (e.g., LED) along with a resistor (R_trans) that limits current through the optical transistor. Light emitted from the light source will either reflect off the rotor or travel through the optical slots cut 307 into each rotor. When the light is reflected the optical transistor will turn ON and pull the voltage at point A1 low. When the light is not reflected the voltage at point A1 will remain high. The low voltage signal A1 is buffered through an operational amplifier and sent from point A2 into the positive input terminal of comparator circuit 1 op amp and the negative input terminal of comparator circuit 2 op amp.

Figure 10:
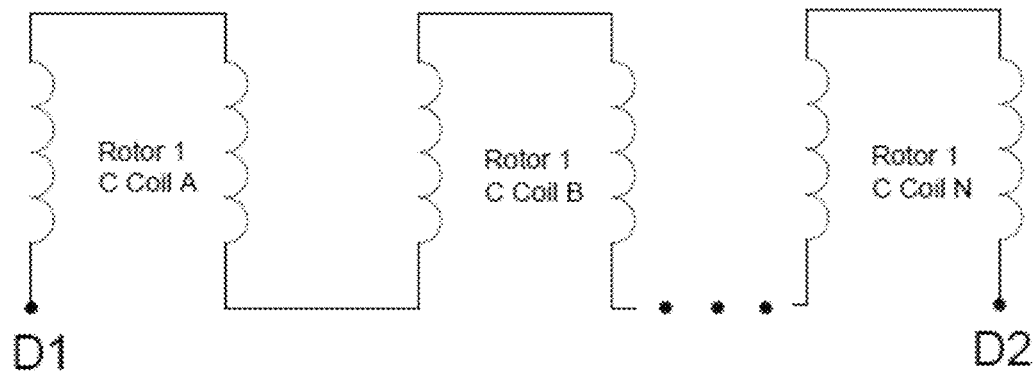
FIG. 10 is a schematic view illustrating a series connection of a single set of rotor coils according to one embodiment of the present disclosure.

Each comparator circuit includes two resistors (e.g., R1 and R2) and an Op Amp. In comparator circuit 1 resistors R1 and R2 are configured in a voltage divider arrangement such that the voltage at point B1 is lower than point A2 when light is not reflected and greater than A2 when light is reflected. In comparator circuit 2 resistors R3 and R4 are configured in a voltage divider arrangement such that the voltage at point B2 is higher than point A2 when light is not reflected and lower than A2 when light is reflected. The outputs from the comparator circuits C1 and C2 are fed into a set of AND gates and then into an H-bridge circuit. Each AND gate also provides for an ENA command that can be controlled with a pulse width signal that will allow control for the rotor speed. When the voltage at C1 is high and C2 is low Q1 and Q4 will allow current to flow through the NPN transistor in the upper left corner and lower right corner of the H-bridge circuit, i.e., current will flow from point E1 to E2. When voltage at C1 is low and C2 is high Q2 and Q3 will allow current to flow through the NPN transistor in the lower left corner and upper right corner of the H-bridge circuit, i.e., current will flow from point E2 to E1. The optical slots and sensors are arranged to coincide with the rotor magnets reaching the middle of each C-coil element of a single-phase set of coils. Each set of phase coils can be connected in series or parallel. A series connection is shown in FIG. 10.

Figure 9:
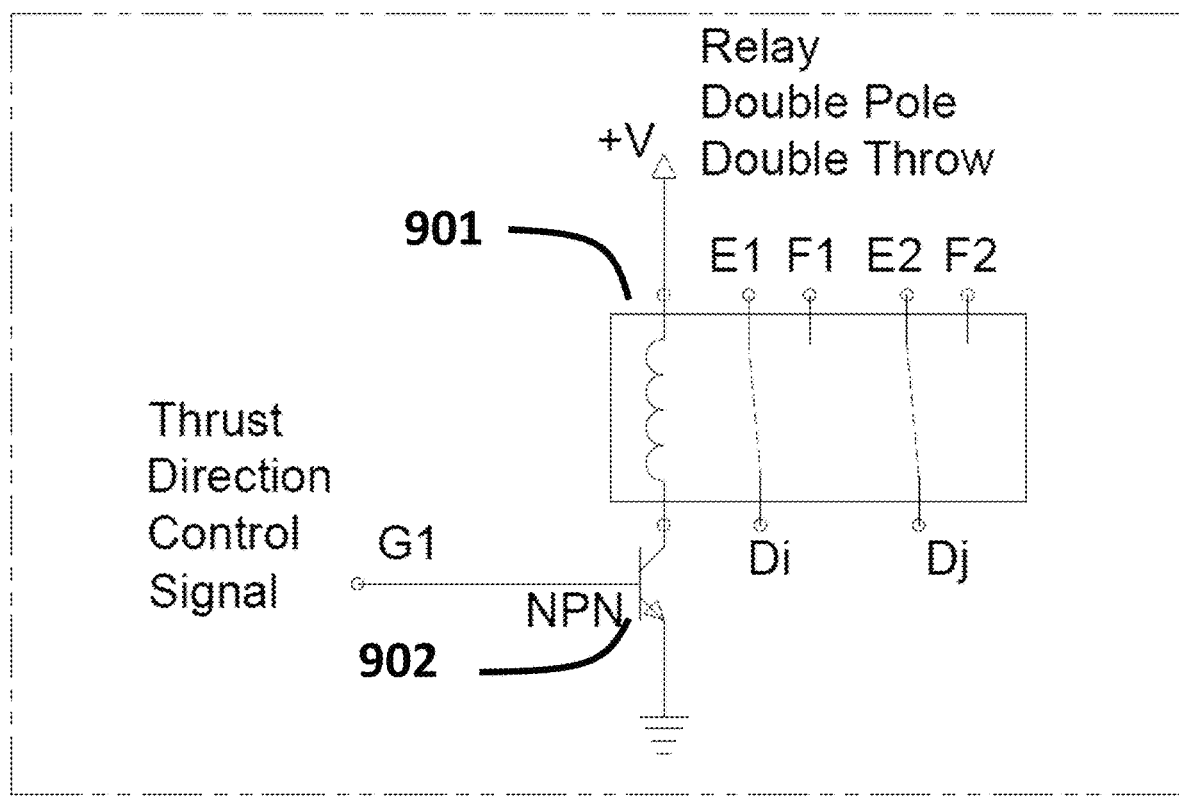
FIG. 9 is a circuit schematic view of a portion of the electronic control that allows current direction through the coils to be reversed thereby enabling thrust and reaction wheel direction control according to one embodiment of the present disclosure.

Thrust direction control is provided by sending a HI signal at G1 to the NPN transistor 902 that will allow current to flow through the coil of a double pole double throw relay 901 as shown in circuit schematic 900 as seen in FIG. 9. Table 2 shows how DPDT state setting could control both reaction wheel and thrust direction.

TABLE 2

| Description | Rotor Direction DPDT Switch State | Rotor Spin Direction | Thrust State | Coil Reaction State |
|---|---|---|---|---|
| Rotor 1 | ON | CW | −y | CCW |
| Rotor 1 | OFF | CCW | +y | CW |
| Rotor 2 | ON | CCW | −y | CW |
| Rotor 2 | OFF | CW | +y | CCW |

Reaction Wheel Operation

By using independent electronic controllers to drive rotor 1 and rotor 2 integral electromagnetic coils this device can also be operated as a reaction wheel. Referring to Table 2, it is shown how DPDT state setting could control both reaction wheel and thrust direction. These torques are characterized by rotor momentum of inertia, angular speed and maximum current flow.

Self-De-Spinning Operation/Feature

As shown in FIG. 4, the rotor experiences a load in the +x direction during operation. The load is carried transiently by ball bearings as the ball bearings travel around the shaft. This loading will compress the ball bearing. Energy of each ball bearing compression is known and can be expressed as $u=½*sigma*epsilon$; where $u$ is the energy density, sigma is the stress and epsilon is the strain and $U$=Integral of $u*dV$; $U$ total energy is equal to u integrated over its volume.

The energy U for each ball bearing will be lost during each revolution it makes. The rate of energy loss will depend on rotor speed, the number of ball bearings and their respective radii and the ball bearing's material type. Rotor/reaction wheel will de-spin at a much quicker rate than if it were unloaded. The power loss of the rotor(s) can be characterized in terms of an average torque ($Tao_{avg}$) needed to overcome the strain energy. Power lost will be of the form Power Loss=$Tao_{avg}*omega$; omega rotor angular speed An amount of time delta_t it will take for a pair of rotors spinning with speed omega1 to come to a stop after powered has been turned off may be estimated.

$Tao_{avg}*delta\_t=I_{rotor}*(omega1-0)$; where $I_{rotor}$ is the rotor moment of inertia or $delta\_t=I_{rotor}*omega1/Tao_{avg}$ For the loading case shown in FIG. 6 $Tao_{avg}$=0.063 Nm.

In this way the device may be able to de-spin itself.

Enhanced Torque/No Saturation Feature

Figure 11:
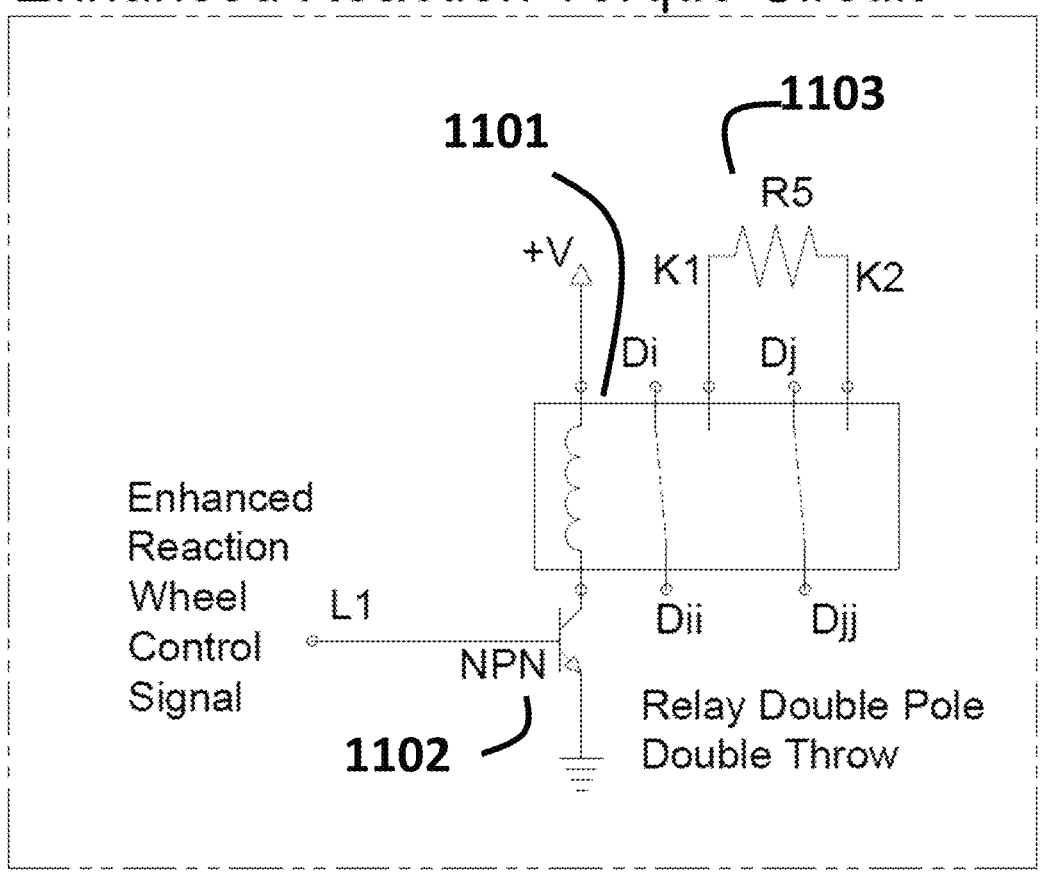
FIG. 11 is a circuit schematic view of a portion of the electronic control circuit that allows a single set of rotor coils to be shorted to itself for enhanced reaction wheel function according to one embodiment of the present disclosure.
Figure 13:
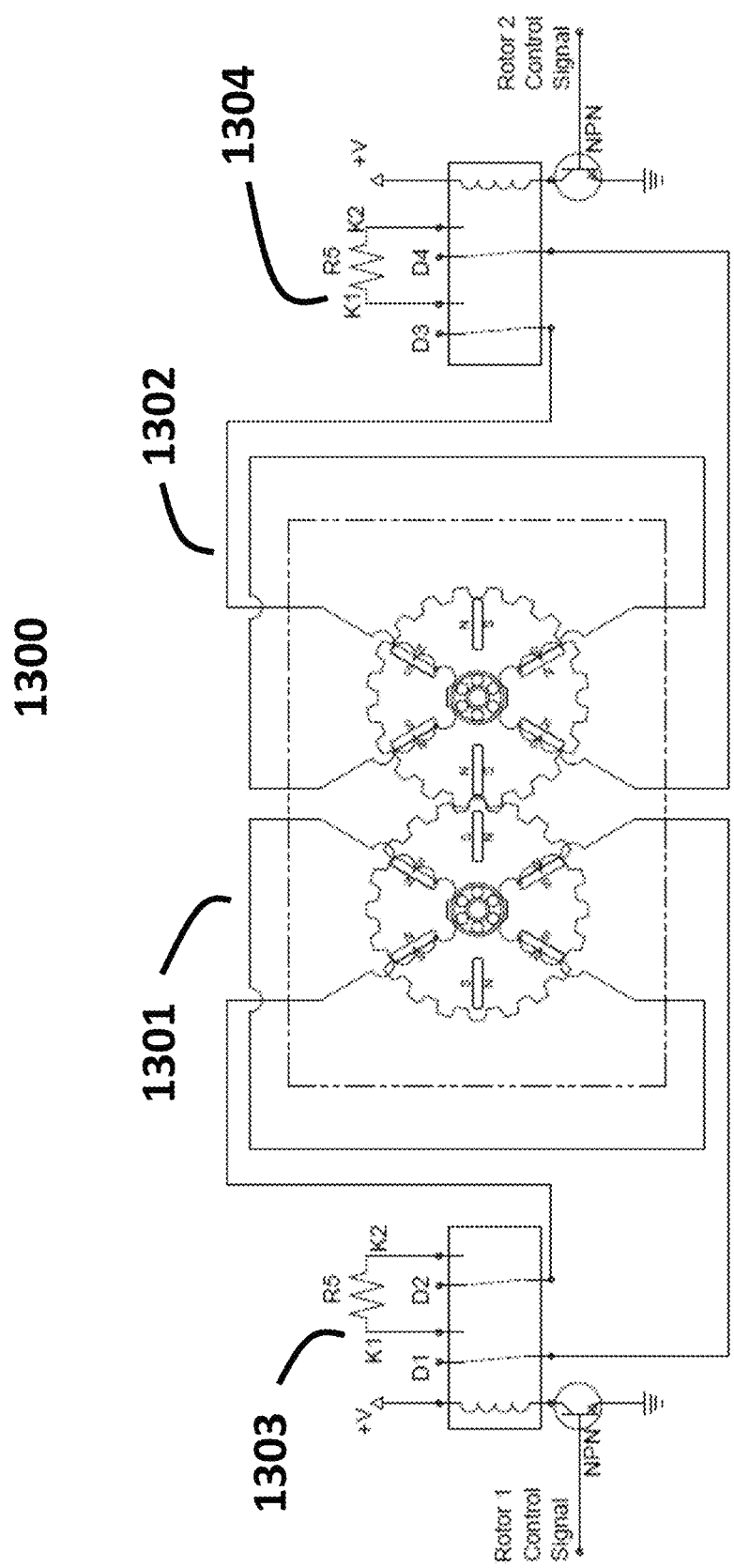
FIG. 13 is a schematic illustrating the first stage of first rotor and second rotor independent control circuits according to one embodiment of the present disclosure.

Another unique feature of this system is the ability to short a set rotor coils to enhance an ability to exert a desired torque. One embodiment of this circuit 1100 is shown in FIG. 11 which illustrates how a double throw double pole relay 1101 along with a transistor 1102 may be put in line with each set of rotor coils that will allow the coils to be shorted to itself through resistor 1103. Referring to Table 3, circuit configuration and system action table is shown for one such embodiment. FIG. 13 shows a schematic 1300 of how device rotor 1 coils 1301 and rotor 2 coils 1302 could be wired to a first enhanced mode reaction wheel relay stages 1303 and 1304.

TABLE 3

| Description | Rotor Direction DPDT Switch State | Rotor Spin Direction | Enhance Torque Mode | Action on Rotor 2 Coils | Action on Rotor 1 Coils |
|---|---|---|---|---|---|
| Rotor 1 | ON | CW | Rotor 2 ON | CW | — |
| Rotor 1 | OFF | CCW | Rotor 2 ON | CCW | — |
| Rotor 2 | ON | CCW | Rotor 1 ON | — | CCW |
| Rotor 2 | OFF | CW | Rotor 1 ON | — | CW |

Figure 12:
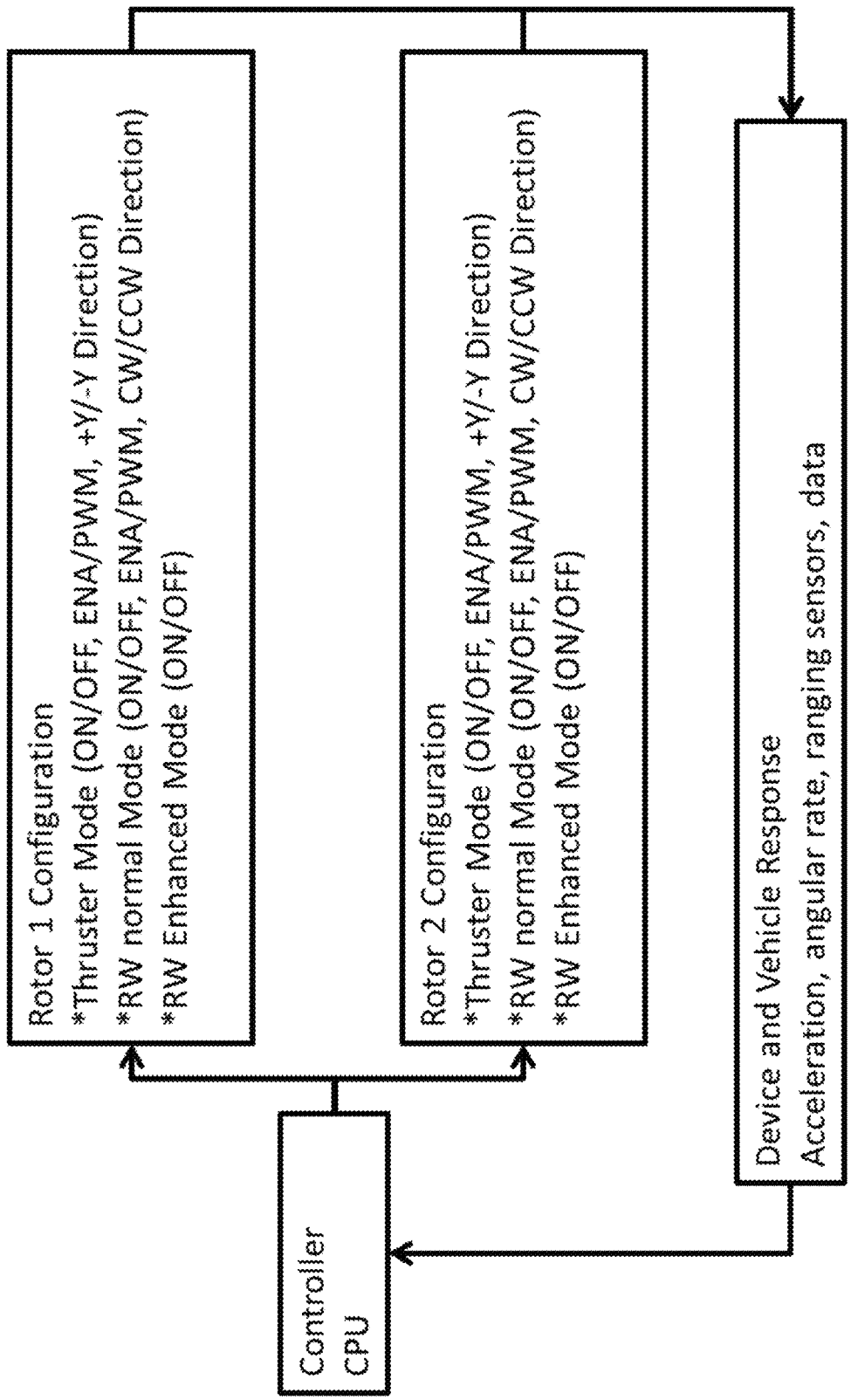
FIG. 12 is a simplified control block diagram showing how the spacecraft controller/CPU, propulsion/reaction wheel device and spacecraft sensors could be used together according to one embodiment of the present disclosure.

FIG. 12 show how an overall control block diagram might look for integrating control of this device into an overall spacecraft system. A central processing unit can send out signals to control relays along with a pulse width modulated enable signal thereby controlling both speed and direction of each rotor. The block diagram assumes that the spacecraft will be equipped with accelerometers, gyroscopes sensors and also be capable of determining the difference to the current state and the desired state and then make necessary adjustments to pulse width values and/or relay settings in order to achieve the desired orientation and/or propulsion effect.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A method of de-spinning a rotor of a propulsion system, the method comprising:
   providing one or more spinning rotors rotatably mounted on a frame with a bearing having a bearing outer race, bearing balls, and bearing inner race;
   providing a force mechanism coupled with the one or more spinning rotors for applying a load to the one or more spinning rotors;
   loading an outer portion of the bearing outer race, bearing balls, and bearing inner race of the bearing, a load on the outer portion of the bearing outer race, bearing balls, and bearing inner race of the bearing corresponding to a force applied to the one or more spinning rotors by the force mechanism;
   wherein the one or more spinning rotors de-spin at a rate corresponding to the load on the bearing balls.

2. The method of claim 1, wherein the one or more spinning rotors comprises a pair of synchronized rotors.

3. The method of claim 2, further comprising a plurality of permanent magnets and arranged such that at least one permanent magnet of a first of the pair of synchronized rotors is attracted to at least one permanent magnet of a second of the pair of synchronized rotors when the permanent magnets are proximate one another at an inboard orientation.

4. The method of claim 3, further comprising providing one or more electromagnets located proximate to the pair of synchronized rotors, wherein the one or more electromagnets are aligned with the plurality of permanent magnets such that a rotational force is imparted on the pair of synchronized rotors when the one or more electromagnets are activated.

5. The method of claim 1, further comprising providing a vehicle on which the frame is mounted.

6. A reaction wheel thrust mechanism comprising:
   a first rotor rotatably coupled on a frame at a first bearing, the first bearing having a first outer bearing race, a plurality of first bearing balls, and a first inner bearing race;
   a second rotor rotatably coupled on the frame at a second bearing, the second bearing having a second outer bearing race, a plurality of second bearing balls, and a second inner bearing race;
   a plurality of permanent magnets located on the first rotor and the second rotor, the plurality of permanent magnets oriented such that at a first permanent magnet on the first rotor is attracted towards at a second permanent magnet on the second rotor when the first permanent magnet is at its most proximate location relative to the second permanent magnet to impart a force on the first bearing balls of the first rotor and the second bearing balls of the second rotor;

a controller for controlling rotation speeds of the first rotor and the second rotor;

wherein when electro-magnetic coils of the first rotor are activated by the controller, the electro-magnetic coils impart a torque onto the first rotor and the first rotor will impart reactionary torque onto the electro-magnetic coils and the frame and a vehicle attached thereto; and wherein when electro-magnetic coils of the first rotor are de-activated by the controller, the force imparted on the first bearing balls of the first rotor and the second bearing balls of the second rotor de-spin the first rotor and the second rotor.

\* \* \* \* \*